May 7, 1968    M. J. LECHA    3,381,612
COLOR REPRODUCING SYSTEM
Filed Aug. 30, 1967    6 Sheets-Sheet 1

INVENTOR.
MANUEL JULIAN LECHA

INVENTOR.
MANUEL JULIAN LECHA

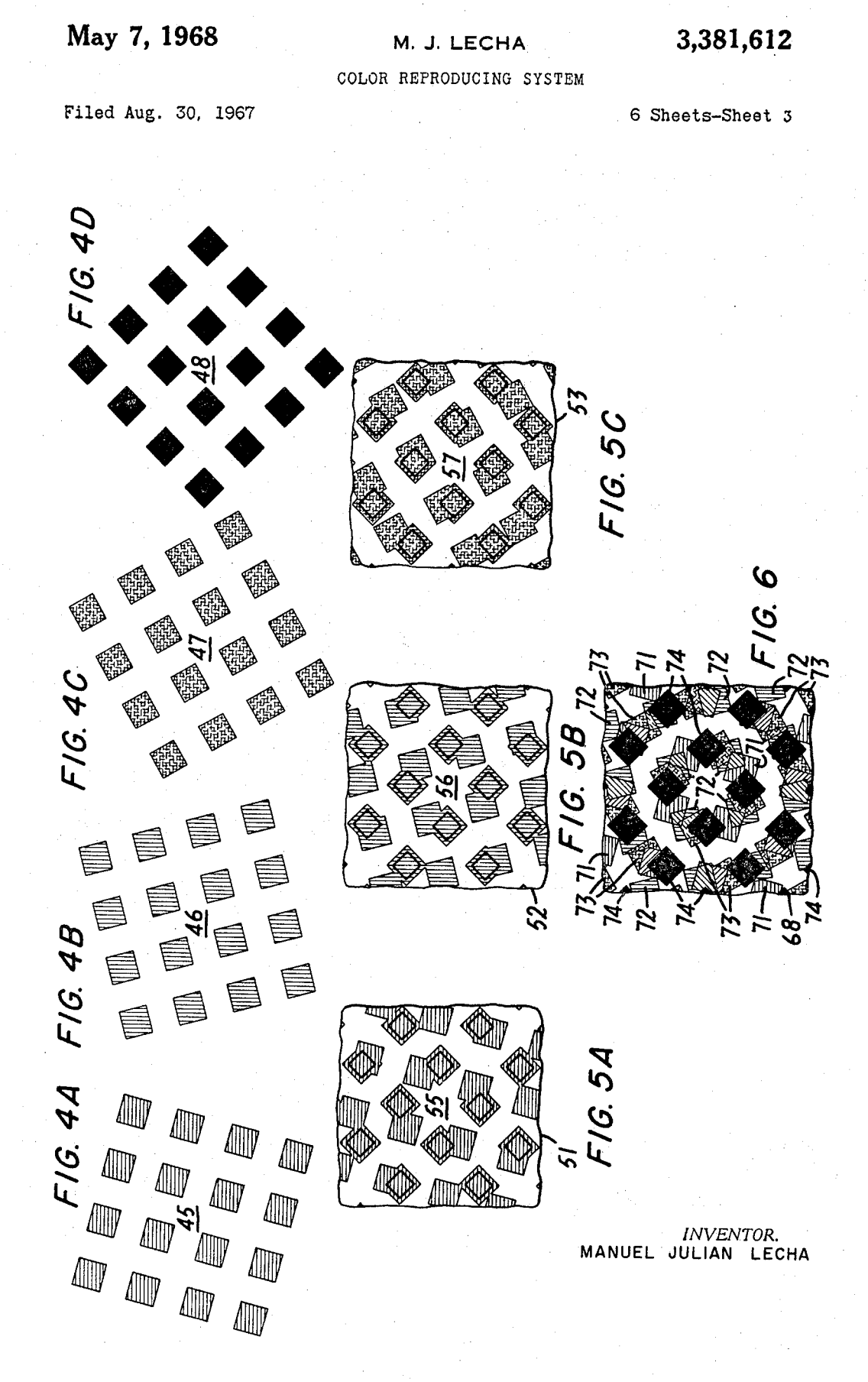

May 7, 1968

M. J. LECHA 3,381,612

COLOR REPRODUCING SYSTEM

Filed Aug. 30, 1967

INVENTOR.
MANUEL JULIAN LECHA

May 7, 1968  M. J. LECHA  3,381,612
COLOR REPRODUCING SYSTEM
Filed Aug. 30, 1967  6 Sheets-Sheet 4

INVENTOR.
MANUEL JULIAN LECHA

INVENTOR.
MANUEL JULIAN LECHA

May 7, 1968    M. J. LECHA    3,381,612
COLOR REPRODUCING SYSTEM
Filed Aug. 30, 1967    6 Sheets-Sheet 6
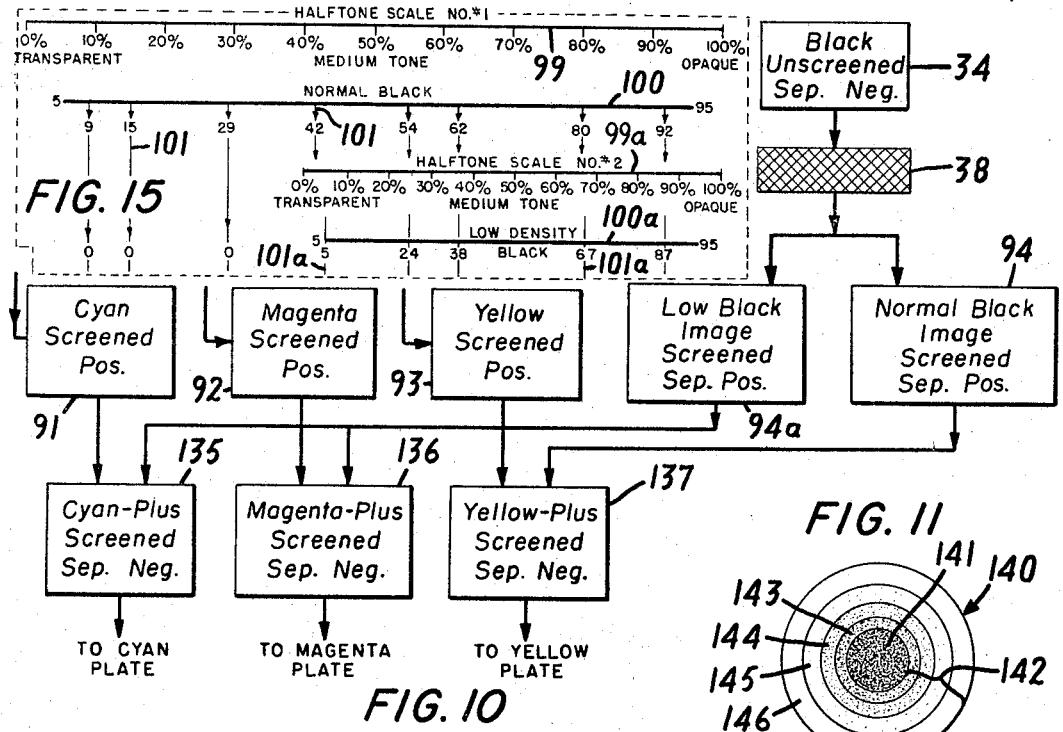
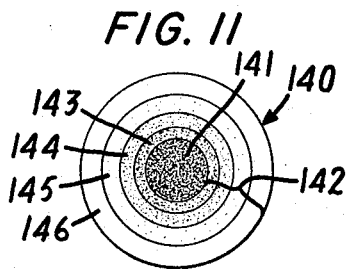
FIG. 11
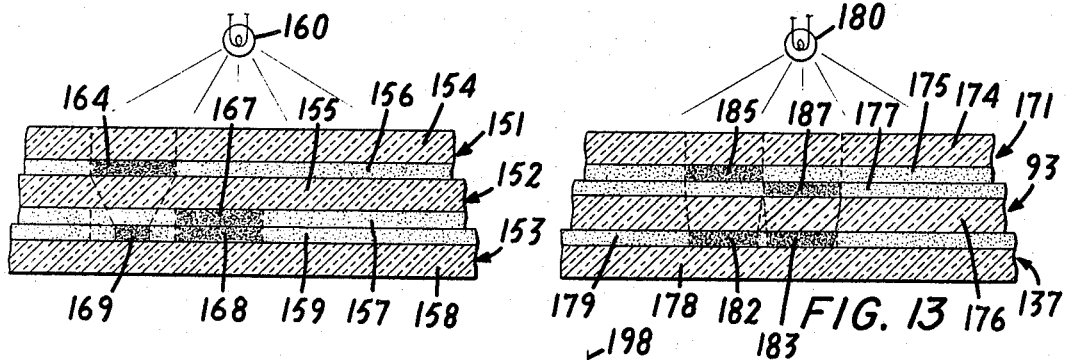
FIG. 12 (PRIOR ART)
FIG. 13
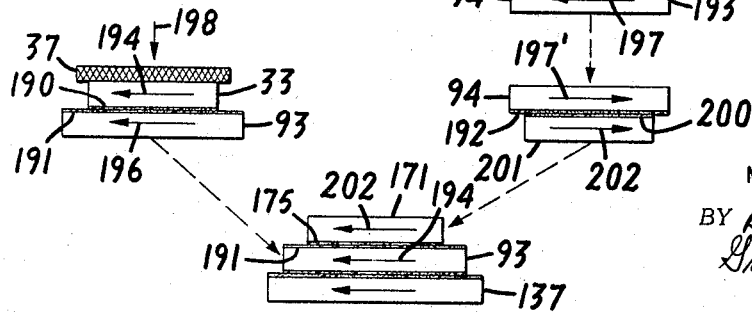
FIG. 14
INVENTOR.
MANUEL JULIAN LECHA
BY Brumbaugh, Free, Graves & Donohue
his ATTORNEYS United States Patent Office 3,381,612
Patented May 7, 1968

3,381,612
COLOR REPRODUCING SYSTEM
Manuel J. Lecha, Barcelona, Spain, assignor to Salvat Editores, S.A., Barcelona, Spain, a corporation of Spain
Continuation-in-part of application Ser. No. 569,922, Aug. 3, 1966. This application Aug. 30, 1967, Ser. No. 664,376
Claims priority, application Spain, Feb. 15, 1964, 296,878
10 Claims. (Cl. 101—401)

ABSTRACT OF THE DISCLOSURE

Color printing methods wherein color component separation images are multiplexed on a lesser number of printing plates reproducing the subject by half tone ink images the same in number and color as the original images. The plates may be at least two less in number than the original images. The black ink image is formed by about 42%, 29% and 29%, respectively, of yellow, magenta, and cyan ink. During multiplexing of the black image with each of the primary color component images, both images are exposed on the film from about the same positions relative to the film.

---

This applicatioin is a continuation-in-part of my co-pending application Ser. No. 569,922 filed Aug. 3, 1966 which is in turn a continuation in part of and was co-pending with my now abandoned application, Ser. No. 431,443 filed Feb. 9, 1965. The invention of this application relates to improvements in methods and means in which graphic carriers of images are used to provide a colour reproduction of a subject in the form of a composite of differently coloured images and in which, by techniques according to the invention, the number of such carriers per stage of processing is rendered less than the number of said differently coloured images. As discussed in more detail, hereinafter, the invention has the advantages among others of enabling savings in cost to be made or of yielding heightened fidelity of colour reproduction or both.

For a better understanding of the invention, reference is made to the following description of exemplary embodiments thereof and to the accompanying drawings wherein:

FIGS. 4a–4d, 5a–5c and 6 are diagrams of exemplary half-tone images obtainable by the FIG. 1 method and other methods according to the invention;

FIG. 10 is a flow diagram of a modification of the colour printing method to which FIG. 9 pertains;

FIG. 11 is a schematic diagram of the distribution of tone density of a typical half-tone dot representative of black;

FIG. 12 is a schematic diagram of a prior art arrangement for making colour-plus separations by contact printing;

FIG. 13 is a schematic diagram of an arrangement according to the invention for making such colour plus separations;

FIG. 14 is a flow diagram of method steps implementing the making of colour-plus separations by the arrangement shown in FIG. 13; and FIG. 15 is a diagram illustrative of typical size relations obtaining between the dots representative of black which are respective to the low and normal black separations characterizing the method of FIG. 7 or the method of FIG. 10.

Figure 1:
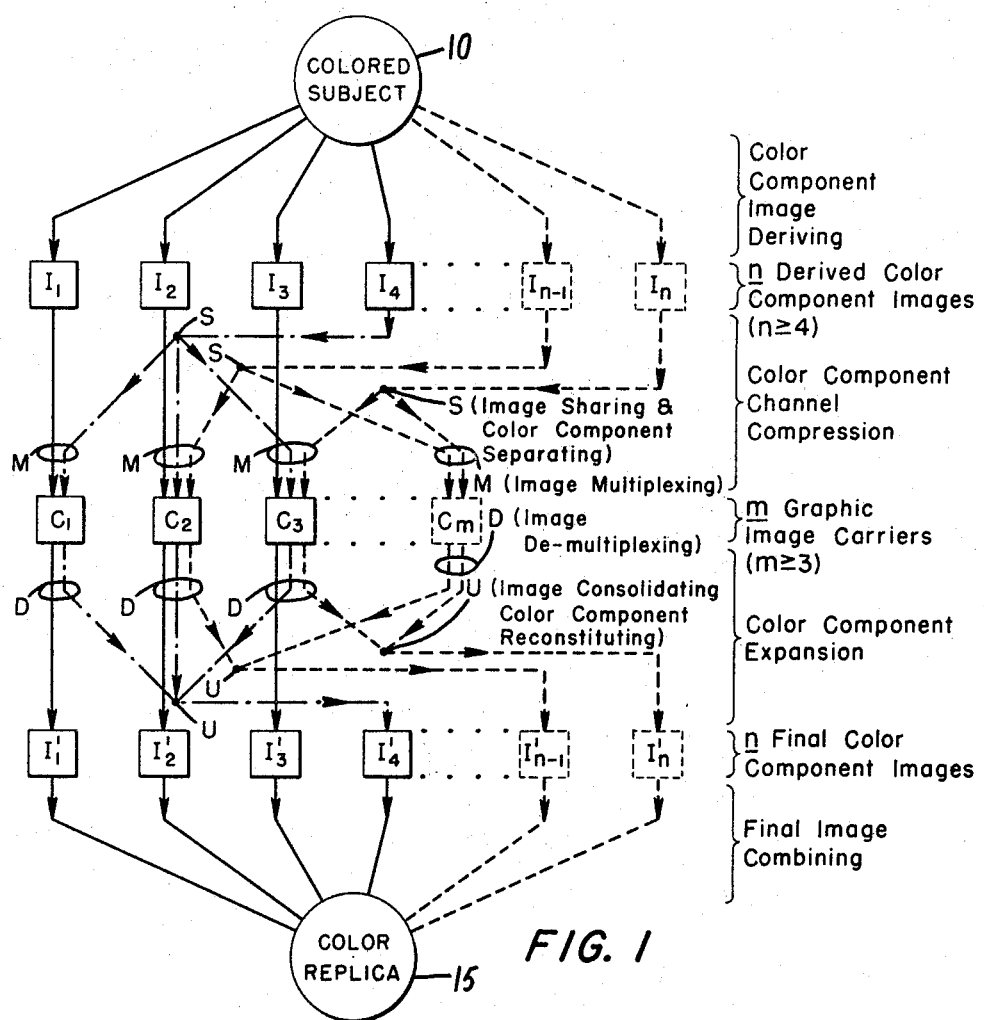
FIG. 1 is a flow diagram which depicts in a generalized and schematic form the functions performed in the course of obtaining color reproductions in accordance with the invention.

To set out first in improved form the description contained in the aforementioned application Ser. No. 431,443, the invention disclosed herein has as its object a new process printing, by means of which one essentially obtains the effects of four-colour reproduction, starting off with only three plates or other printing elements, and consequently only making three printings. By a printing is meant the action which occurs each time the printing element makes contact with the surface to be printed or otherwise causes transfer of a printed image to that surface.

Thus, it concerns a process which constitutes an improvement on the classical methods of three- and four-colour production, excelling the former, practically abandoned already, in the technical effects and quality of the printing obtained, and the latter, also up to a certain point in the technical effects and, above all, because of the fact that it allows the saving of at least one plate and one printing.

As is known, three-colour printing is effected by the obtaining with three printing elements of three half tone dot images in different colours (yellow, red and blue) which, by juxtaposition of their respective half tone dots should theoretically give the original reproduction in all its tones. With this process, of general acceptance and use for many years, printings were obtained which, nevertheless, suffered from lack of contrast, so as to result in a reproduction with a dull appearance and lacking in fullness of tone density range. To correct these defects, a fourth colour, black, was later added to reinforce the images and to obtain, not by colour, but by intensity of the black, a greater tone density range in the printing. This system, denominated four-colour reproduction, gave the desired result and, in spite of requiring the use of a fourth printing element and consequently the carrying out of a fourth printing operation, it was generally accepted and is the system commonly used at the present time.

The new system which is disclosed herein involves the use of only three plates or other graphic color component image carriers, each one of which is characterized by two schemes (i.e., positional distributions of half tone dots), namely, the scheme corresponding to the colour (blue, yellow or red) to which the plate belongs plus a scheme which is common to all the plates and which corresponds to the black colour. In this way, in carrying out the printing, dots of colour are obtained which remain juxtaposed the same way as in a normal three-colour reproduction. At the same time, there are also obtained other dots of colour which correspond to the common scheme of the three plates and which are printed in superposed registering relation so as, by addition of the three colours, to give the black of the four-colour reproduction as a result. Thus, the technical effects of four-colour reproduction are obtained, with certain advantages for the new system as regards quality, and, moreover, by starting off with only three plates and by making only three printings.

In accordance with the process just described, one begins by obtaining four screened separations which are negatives or positives, according to the printing system to be used, and which correspond to the blue, yellow, red and black range of the image to be reproduced. Each of those negatives or positives is screened at a different angle in accordance with the usual practice. Continuing, three further colour component separations (which are positives or negatives) are obtained by projection, contact, insolation or another method on the film or sensitive material used by the technique whereby the separation (negative or positive) which corresponds to the black is employed in superposed relation with each, one at a time, of the separations (negative or positive) which respectively correspond to the colours blue, yellow and red. Three positives or negatives are obtained in this way, and the half tone images on those positives or negatives are translated by isolation, or another method, to three corresponding plates or printing elements.

As a result, each one of the plates obtained is characterized by two half tone dot schemes, one corresponding to the colour, blue, yellow or red, of the plate and another scheme, which is common to all the plates and which corresponds to the black colour, it being understood in connection with the foregoing that the three plates have been obtained from positives or negatives in whose obtention a common negative or positive (that corresponding to the black colour) has intervened. Thus, three plates are obtained which respectively bear: the scheme corresponding to the blue colour plus the scheme corresponding to the black; the scheme corresponding to the red colour plus the scheme corresponding to the black; and the scheme corresponding to the yellow colour plus the scheme corresponding to the black.

On proceeding to print, the plate corresponding to the blue colour will print in this same colour on a receiving medium both of the two said schemes associated with that plate. That is to say, the blue image transferred from that plate will correspond to the scheme itself of the blue colour, plus the scheme common to the three plates, corresponding to the formation of the black. The plate corresponding to the yellow colour will also print in that same colour with the two schemes which it carries, producing some dots of yellow colour, corresponding to the scheme itself of this colour, which will be in juxtaposed relation to the blue points obtained in the first printing, and other dots, also yellow, corresponding to the common scheme for the printing of the black colour, which will be positioned in superposed registering relation with the points corresponding to the common scheme printed by the first plate. The same will happen with the third plate which will also print in the color associated with that plate, the two schemes which it carries, producing dots of red, corresponding to the scheme of this colour, which will be juxtaposed to those of the non-common schemes obtained in the first two printings, plus dots of red, corresponding to the common scheme, which will be positioned in superposed registering relation with the dots obtained through the printings carried out of the common scheme of the first two plates. Therefore, at the dot positions corresponding to the common scheme of the three plates, there will be obtained the superposition in registration of the colours, blue, yellow and red, which will give the desired black colour as a consequence. Thus, the result given by the final printings with the three plates, each one with the scheme of one colour plus the common scheme corresponding to the formation of the black, is a colour reproduction formed of four differently coloured half tone dot patterns which are juxtaposed, in a similar way to that characterizing the usual four-colour reproduction, the four patterns being: one blue, one yellow, one red and, finally, one black, formed by amalgamation of the dots of the three differently coloured inks at the dot positions corresponding to the common scheme of the three plates.

This process, which can be used in different printing systems, such as typography (i.e., letterpress or relief printing), offset-lithography (i.e. planographic printing), gravure (i.e., intaglio printing) and others, evidently involves a small increase in the cost of obtaining the plates. That increase, however, is more than compensated for by the saving involved in the elimination of the plate corresponding to the black, the saving corresponding to one printing remaining as net profit.

In connection with the foregoing, it should be noted that, in the preceding description, reference has been made to a four-colour reproduction obtained from the four classical colours, blue, yellow, red and black, the latter being obtained in accordance with the process which is described by the sum of the other three. However, it is to be understood that the process in question can also be satisfactorily applied to the obtention of four-colour reproduction in which, to provide outlining effects or to reinforce the image (a different colour from black may be used, such as, for example, a brown or other suitable one, which may be obtained by the sum or superposition of the other three or from two of them. It is also fitting to apply the process to the obtention of colour printings from plates which are greater than three in number and which correspond to different colours, the use of the process always involving the saving of one or more plates. To the latter effect, if desired, the number of schemes which each plate carries may be multiplied to the end of obtaining a greater number of combined colours. With the process to which the invention relates, it is also fitting to obtain different contrasts of black, by increasing or decreasing the intensity of the black which is associated in the process with each chromatic colour, but always maintaining the same scheme for the black.

While the foregoing disclosure should of itself be wholly adequate to enable one skilled in the colour reproducing art to practice the invention in all its aspects, for the benefit of those not so familiar with the art, there will be given a further discussion of the invention.

FIG. 1 depicts in a generalized manner the character of the invention and the functions performed in the course of practicing it.

In FIG. 1, the reference numeral 10 designates an original polychromatic subject which may be, say, a colour transparency. The subject 10 acts as a colour source from which is derived a plurality of $n$ different color component images $I_1, I_2, I_3, I_4, \ldots I_{n-1}, I_n$. Those derived I images may be, for example, light images, tone density images on photographic film, electrical signal images or other type images. Each of the I images is derived from the subject 10 and corresponds to a different chromatic or achromatic colour component thereof.

The images $I_1, I_2$ and $I_3$ each correspond to a respective one of three chromatic colour components which are primary colour components in the sense that the colours thereof are three selected primary colours into which all of the colours of the subject may be resolved. A further image $I_4$ corresponds to a colour component of subject 10 different from the colour components associated with the first three images. Moreover, the set $n$ of I images may include one or more additional different colour component images as, for example, the images $I_{n-1}$ and $I_n$. Hence, the number $n$ of I images is equal to or greater than four.

The $n$ separate I images are imparted to a set $m$ of colour component channels designated in FIG. 1 by the reference numerals $C_1, C_2, C_3, \ldots C_m$. Each of those channels may be comprised of a single graphic carrier of an image such as a photographic film or a printing plate. Alternatively, each of the channels may be comprised of a plurality of image carriers which each correspond to one particular colour component, and which are casually linked together in an image-transferring succession of such carriers. The set of $m$ channels necessarily includes a first three of such channels $C_1, C_2$ and $C_3$ which respectively correspond to the three aforementioned primary color components of the subject 10. That set may, however, also optionally include one or more other image carrier channels as, for example, the channel $C_m$. Therefore, the number $m$ of separate colour component channels is equal to or greater than three.

In conventional colour reproduction, there is of necessity a one-for-one relation between the $n$ colour components associated with the I images and the $m$ colour components associated with the set of channels by which those images are transferred. In other words, every one of the colour components respectively associated with the I images requires its own corresponding image transfer channel.

In accordance with the invention, however, a compression of colour component chanels takes place in the sense that, for at least part of the colour reproducing process, the image-transferring colour component channels are reduced to a number less than that of the different colour component images derived from the original polychromatic subject or that of the different colour component images by which the subject is reproduced. Such compression of the colour component channels is made possible by the consideration that, once given three channels $C_1$, $C_2$, $C_3$, for transferring the three main primary colour component images of the subject, any additional colour component image of the subject may be resolved into two or three colour sub-component images for which the respectively associated colours are the same as those respectively associated with two or three of the mentioned three channels. Because the additional images may be so resolved, that additional image may be transferred by the use of two or three of those primary colour component channels (i.e., without the use of any additional channel) by producing an effectual or virtual resolving of the original additional image into colour sub-component images, transferring each of the latter images through the appropriate one of the primary colour component channels and then reconstituting the colour and the point-to-point detail of the original additional image from the transferred colour sub-component images. The original or additional image is said to be effectually or virtually resolved into colour sub-component images because it is not in fact necessary to create the colour sub-component image by an actual colour resolution (by coloured filters or the like) of the colour component of the original image. All that is required is that the original additional image be distributed to each of those ones of the primary colour component channels whose respectively associated primary colours are capable in combination of reconstituting the colour corresponding to the original image and that, moreover, there be some mode of later separating the prinicpal and additional images in each channel.

The manner of effecting compression of the colour component channels is shown in FIG. 1 wherein the image $I_4$ is a black image and is distributed among the three channels $C_1$, $C_2$, $C_3$ to be shared by them. In like manner, the additional colour component image $I_{n-1}$ is shared among channels $C_2$, $C_m$ and the further colour component image $I_n$ is shared among channels $C_3$, $C_m$. Each such channel sharing of an image is designated by one of the shown branch points S which also designates a virtual separating of the colour component of the shared image into colour sub-components the same in colour as those associated with the channels among which that image is shared.

A concomitant of the described sharing of certain of the I images is a multiplexing of the images transferred by one or more of the colour component channels. That is, in channel $C_1$, the $I_4$ black colour sub-component image is mutliplexed with the primary colour component image $I_1$ (which may be a cyan image). Further, in channel $C_2$ the primary colour component image $I_2$ (which may be a magenta image), an $I_4$ black colour sub-component image and an $I_{n-1}$ colour sub-component image are multiplexed together, and so on for the other channels. The occurrence in the FIG. 1 diagram of multiplexing of images is indicated by the convergences of image lines at the regions M.

From the foregoing, it will be evident that, theoretically, the number $n$ of different colour component images which can be transferred by multiplexing through the $m$ channels is at least equal to the number of combinations which can be formed of the $m$ channels taken first one at a time, then two at a time, and so on up to $m$ at a time. By combination theory, such number can be calculated as being:

$$n = \sum_{r=1}^{r=m} \frac{m!}{r!(m-r)!}$$

or $n=7$ for three channels, $n=13$ for four channels and so on. However, the number $n$ is not necessarily limited to the number of combinations which can be formed, as described, of the colour component channels employed. That is, two given different colour component images $I_p$ and $I_q$ may be shared between the same two (or three or more) colour component channels for the purpose of transference of each image and, nonetheless, can both be recovered from those channels as distinct images of different colour because each image is shared in different proportion by the channels common thereto.

From this it follows that the number $n$ of images transferable through the $m$ channels by multiplexing can theoretically exceed the value given by expression (1). Practical considerations, however, place a limit on the number of images which can be transferred by any one channel, wherefore it would be seldom that the total number of distinct differently coloured images which are effectively transferred and thereafter reconstituted would reach the value calculated from expression (1).

After the images in the channels have been transferred therethrough, those images are de-multiplexed from each other to recover $n$ different colour component images $I'_1, I'_2, I'_3, I'_4 \ldots I'_{n-1}, I'_n$ of which each replicates the point-to-point detail and colour component of the corresponding respective one of the $n$ distinct I images supplied to the $m$ channels. The de-multiplexing or differentiating from each other of the previously multiplexed channel images is indicated in FIG. 1 by the diverging image lines at the regions marked D. As a part of the obtaining of the I' images, those of the channel images which are colour sub-component images of any given original I image are consolidated to thereby fully reconstitute that I image both in point-to-point detail and in colour component. Such consolidations of colour sub-component images are indicated in FIG. 1 by the branch points U. Because the number of I' images yielded by the $m$ channels is greater than the number of those channels, the effect of the de-multiplexing of the channel images and of the consolidating of ones thereof is to provide, in effect, a colour component expansion.

To obtain the final colour roproduction, the $n$ recovered different colour component I' images are combined with each other to form a composite providing a colour replica 15 of the original polychromatic subject 10. As will be evident from the preceding discussion and that which follows, the functions of de-multiplexing, image consolidation and combining of images to provide the $n$ final I' images may be performed in one process step.

As specifically described in this application, the de-multiplexing of the channel images and the consolidation of colour sub-component channel images of common origin is made possible by relying on the geometrical aspects of those images. That is, as specifically described herein, each of the $n$ separate I images which are imparted to the $m$ channels is a half tone image characterized by a different positional distribution of the half tone dots constituting that image. Moreover, each of the I images which is shared (in the form of colour sub-component images) among two or more of the channels is identically positioned on each of the one or more graphic image carriers of each of such channels. Hence by sorting the channel images on the basis of which positional distribution of dots characterizing the images are of the same distribution and which are different, the shared images can readily be differentiated from the unshared images, and each colour sub-component image of an original I image can be consolidated with and only with each other colour sub-component image of that original I image. It will be appreciated, however, that systems according to the present invention need not necessarily be limited to those in which different positional distributions of half tone dots are relied upon to discriminate between transferred multiplexed images and to provide for colour component expansion.

A different positional distribution of the half tone dots may, of course, be obtained in various ways. Thus, for example, even though two sets of half tone dots belonging to two respective images are arranged in patterns derived from the same half tone screen or identical half tone screens, the two sets of dots may be discriminated from each other by relative translational displacement of the two patterns. Alternatively, the two respective half tone dot patterns of two different images may be differentiated from each other by each having a different number of lines per inch in the pattern. Most conveniently, however, different positional distrbutions of the half tone dots of the various images can be realized by employing the practice conventional in three or four colour reproduction of using an identical screen to produce the half tone dot pattern of each image, but of providing a different screening angle for each colour component image. The above-discussed alternative ways of providing images having different positional distributions of their constituent dots may, of course, be used in combination.

In the final colour reproduction of the subject, the described differing positional distributions of the half tone dots constituting each final image causes the dots of different images to be juxtaposed in the sense that the dot patterns or distributions of those images are in mutually non-registering relation by virtue of relative angular or translational displacement from each other or by having different numbers of lines per inch or for some other reason. On the other hand, as previously described, each half tone colour dot belonging to a colour subcomponent image derived from a given original I image will be printed in the same position as the corresponding dots of each of the one or more other colour subcomponent images derived from that original image. Such superposition in registration of corresponding dots of the respective colour subcomponent images and the amalgamation of the respective colours of those dots causes the original colour component image to be reproduced both in all its point-to-point detail and in its appropriate color.

The various ways in which the features of the FIG. 1 diagram are embodied in specific methods of practicing the invention will be apparent from the following description of one of those methods.

Figure 2:
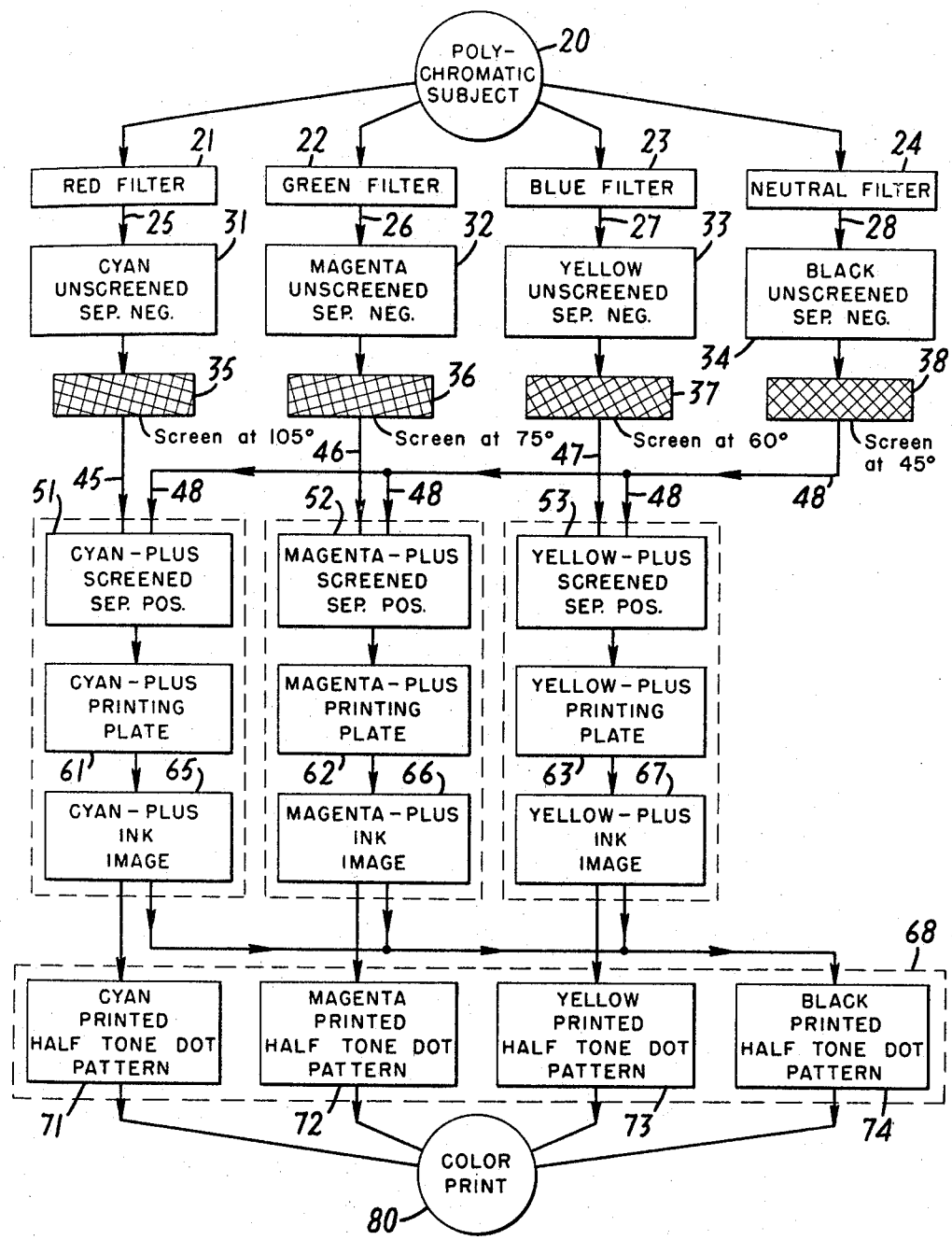
FIG. 2 is a schematic flow diagram of a color printing method in accordance with the invention.

FIG. 2 depicts one method of carrying out the already described process for effecting four colour printing by three primary colours and black from only three printing plates. In FIG. 1, the light from an original polychromatic subject 29 (which may be a colour transparency) is passed through red, green and blue filters 21, 22 and 23 and through a neutral filter 24. The filters 21, 22 and 23 resolve the colors on the subject into the three primary additive colours red, green and blue so as to derive from the subject three primary colour component continuous-tone light images thereof, namely, a red image 25 of the subject, a green image 26 thereof and a blue image 27 thereof.

While the neutral filter 24 is shown as being a single element, the neutral filtering action is usually provided by utilizing in combination the three chromatic filters 21–23 or the separate filtering effects of those three filters. The purpose of the neutral filter is to derive from subject 20 a continuous tone light image 28 which corresponds to the point-to-point intensity of the light from the subject on the black-to-white or neutral tone scale.

In addition to the described step of filtering the light from subject 20 to derive the four mentioned different colour component images 25–28, the FIG. 1 method may also include other conventional steps carried out concurrently with or separately from the filtering step. Examples of such additional conventional steps are colour correction masking and/or undercolour removal.

The light images 25, 26, 27 and 28 are exposed on four respectively corresponding sheets of sensitized photographic film which are thereafter processed to provide the four shown unscreened colour separation negatives 31, 32, 33 and 34. Each of such negatives is a colour transparency. The separation transparency 31 is referred to as a negative because the transmissivity of that transparency varies inversely from point to point with the intensity of the red light from which the separation image is derived. Moreover, separation 31 is referred to as a cyan separation because the image thereon will eventually be reproduced in cyan which is the primary subtractive colour complementary to the primary additive colour of red. Hence separation 31 is a "cyan negative." That designation is, however, somewhat of a misnomer because, for the cyan colour component, the image on separation 31 is actually a positive image in the sense that the point-to-point transmissivity of the image varies directly with the point-to-point density of the cyan ink in the ultimately formed print and with the point-to-point intensity of the cyan colour component of the original. Also, while the image on separation 31 corresponds to the cyan colour component, the image on the film is, in fact, a black and white image.

For analogous reasons, the separations 32, 33 and 34 are referred to as magenta, yellow and black negatives, respectively. The words "cyan" and "magenta" as used in this part of the application correspond to (and in terms of colour are the substantial equivalents of) the words "blue" and "red" used in application Ser. No. 431,443.

Figure 3B:
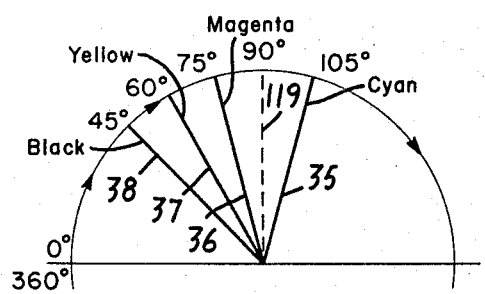
FIGS. 3a and 3b are schematic diagrams pertaining to exemplary half-tone screening practices employable in the FIG. 1 method and other methods according to the invention.
Figure 3A:
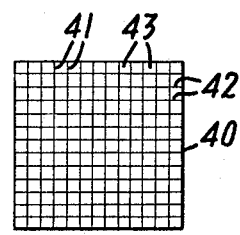

The separation negatives 31, 32, 33 and 34 are associated with half tone screens which are shown in FIG. 2 as four screens 35, 36, 37 and 38 each corresponding to a respective one of the negatives. FIGS. 3a shows some of the details of a typical half tone screen 40 exemplary of all the screens 35–38. The screen 40 is formed in a well-known manner from two glass plates of which each has a set of parallel lines ruled thereon. The two plates are placed in contact so that the respective lines of the two plates are at right angles to form a cross-ruled reticulated grid pattern of vertical lines 41, horizontal lines 42 and square interstices 43 between the crossing lines. For relief printing, the screen 40 has opaque lines and transparent interstices as shown, but, for gravure printing, the lines are transparent and the interstices are opaque. As is known, half tone screens are graded according to number of lines per inch of screen so as to be either a coarse screen or a fine screen.

Each of the screens 35–38 is characterized by the same number of lines per inch. The screens differ, however, in screening angle. That is, as shown by the diagram of FIG. 3b, the vertical lines of the black screen 38 are at an angle of 45° to the 0° reference line, and the vertical lines of the screens 37 and 36 and 35 are at respective angles of 60°, 75° and 105° relative to that line. The screening angles just given are the ones usually employed in colour reproduction for the black, yellow, magenta and cyan colour component images of an original subject in the course of converting those images into half-tone.

Coming now to the next method stage, the cyan transparency 31, the black transparency 34 and their associated screens 35 and 38 are all placed in superposed relation between a light source and a photosensitive sheet or film. By the use of registration marks (not shown), the superposition of the mentioned negatives and screens is effected in a manner so that all those elements are in accurate registration. Screens 35 and 38 are, as described, at screening angles of 105° and 45°, respectively.

When the elements 31, 34, 35 and 38 have been superposed and accurately registered, light is passed through the superposed assembly to expose an image on the photosensitive sheet. As indicated by FIG. 2, that exposed image is the sum of two images, namely, (a) a first half tone image 45 produced by passage of light through the cyan transparency 31 and the 105° angled screen 35, and (b) a second half tone image 48 produced by passage of light through the black transparency 34 and the 45° angled screen 38. After exposure has been completed, the photosensitive sheet is processed to convert it into the screened colour separation positive 51 which is a transparency.

The respective half tone dot patterns of the images 45, 48 are shown by FIGS. 4a and 4d, respectively. Because the screening angles for the two images are different, the positional distribution of dots in FIG. 4a is different from the positional distribution of dots in FIG. 4d. While FIGS. 4a and 4d show dots of uniform size and density, it will be understood that, in relief or planographic printing, such dots on the printing plate will be of variable size to provide an image with detail and, for gravure printing, the dots on the printing plate will be of the same size but of variable density to provide the image detail.

FIG. 5a shows the character of the tone density image 55 produced on positive 51 by the exposure thereon of both of images 45 and 48. In image 55, the dots with no special marking belong to an A portion of the image and correspond one-for-one in identity and position with the dots of image 45 as shown by FIG. 4a. On the other hand, in image 55 the dots designated by solid line squares within their peripheries are dots which belong to a B portion of image 55 and which correspond one-for-one in identity and position with the dots of image 48 as shown by FIG. 4d. Image 55 is thus a composite of a first half tone image corresponding to the cyan colour component and of a second half tone image corresponding to the black colour component. Because the image of positive 51 is formed in part of the mentioned black half tone image as well as being formed of the cyan half tone image which would normally be on that positive, the separation positive 51 is referred to herein as the "cyan-plus" positive.

A magenta-plus screened separation positive 52 and a yellow-plus screened separation positive 53 are produced in a way analogous to that already described for positive 51. That is, to make the magenta-plus positive, elements 32, 34, 36 and 38 are superposed, light is passed through the superposed elements to yield half tone light images 46, 48 and those light images are exposed together on a photosensitive sheet which is thereafter processed to form the finished magenta-plus separation. Similarly, to make the yellow-plus positive 53, elements 33, 34, 37 and 38 are superposed, light is passed through the superposed elements to yield the half tone light images 47, 48, and those light images are exposed together on a photosensitive sheet which is thereafter processed to form the finished yellow-plus separation. FIGS. 4b and 4c are diagrams of the positional distribution of half tone dots which are characteristic of, respectively, the magenta half tone light image 46 and the yellow half tone light image 47. FIG. 5b illustrates the character of the resulting density image 56 exposed on magenta-plus positive 52 and FIG. 5c illustrates the character of the resulting tone density image 57 exposed on the yellow-plus separation positive 53. In FIG. 5b the unmarked dots belong to an A portion of image 56 and correspond one-for-one with the dots shown in FIG. 4b, whereas the dots marked by solid line squares belong to a B portion of image 56 and correspond one-for-one with the dots of the black light image 48 which are shown in FIG. 4d. In FIG. 5c, the unmarked dots of the image 57 belong to an A portion of that image and correspond one-for-one with the dots of the yellow light image 47 shown by FIG. 4c, whereas the dots marked by solid line squares belong to a B portion of image 57 and correspond one-for-one with the dots of the black light image 48 shown by FIG. 4d.

Thus, each of density images 55, 56, 57 of FIGS. 5a, 5b, 5c is formed of a first or an A constituent half tone image corresponding to a respective one of the primary colours, cyan, magenta, yellow, and of a second or B constituent half tone image corresponding to black. Comparing the mentioned figures, it will be seen that the three B images on the three separation positives 51–53 are identically positioned on those positives so that if those positives were to be placed in superposed accurately registering relation, the dots of the three B images would register exactly with each other. It will also be seen that the shared B images (considered as a common image) and the three A images have a different positional distribution of their constituent half tone dots (by virtue of having different screening angles) so as to be capable of differentiation from each other.

While four screens 35–38 have been mentioned, in producing positives 51–53 it is necessary to have only two screens which, for each positive, are each set to one of the two screening angles used with that positive.

The half tone images 55, 56, 57 on the separation positives 51, 52, 53 are transferred (FIG. 2) in a conventional way to, respectively, a cyan-plus printing plate 61, a magenta-plus printing plate 62, and a yellow-plus printing plate 63. In FIG. 2, plates 61–63 are deep etch plates (of the type used in offset printing) and have their respective images transferred thereto from color plus separations which are positives as is conventional for that type of printing. If plates 61–63 were relief plates, then the images would be transferred thereto from color plus separations which are negatives and which may be derived by contact printing from the separation positives 51–53. Whatever the character of the plates, they are treated in the way usual for the type of plate involved to develop the images thereon. Each of those developed images is a dot structure image which is a negative in relation to the additive primary colour (red, green, blue) from which the A image on the plate was originally derived, but which is a positive in relation to the subtractive colour (cyan, magenta, yellow) complementary to that additive colour.

After the plates 61–63 have been finished, they are used in the conventional way in a colour printing press. That is, the plates 61, 62, 63 are inked with, respectively, a cyan-coloured ink, a magenta-coloured ink and a yellow-coloured ink to produce ink images 65, 66, 67 on the three plates. The cyan ink image on plate 61 is a replica of image 55 (FIG. 5a), the magenta ink on plate 62 is a replica of image 56 (FIG. 5b) and the yellow ink image on plate 63 is a replica of image 57 (FIG. 5c).

After the plates 61–63 have been inked, the ink images 65–67 thereon are successively transferred by contact or otherwise to a common area on a web or paper 68 (FIGS. 2 and 6) or other ink-receiving medium so as to form printed half tone dot patterns on that area. Those half tone dot patterns are of the following character.

Referring again to FIGS. 4a–4d and 5a–5c, the ink dots of the cyan-plus ink image 65 which correspond to the A portion of image 55 (FIG. 5a) will deposit on the paper 68 to form a printed cyan half tone dot pattern 71 (FIGS. 2 and 6) replicating image 45 (FIG. 4a). The ink dots of the magenta-plus ink image 66 which correspond to the A portion of image 56 (FIG. 5b) will deposit on the paper 68 to form a printed magenta half tone dot pattern 72 (FIGS. 2 and 6) replicating image 46 (FIG.

4b). The ink dots of the yellow-plus ink image 67 which correspond to the A portion of image 57 (FIG. 5c) will deposit on the paper 68 to form a printed yellow half tone dot pattern 73 (FIGS. 2 and 6) replicating image 47 (FIG. 4c). Thus far then, we have deposited on a common area of the paper 68 three printed chromatic half-tone dot patterns 71–73 which are of the subtractive colours cyan, magenta and yellow, respectively. While some of the dots of those patterns may partly overlap, the respective dots of the three patterns are juxtaposed in the sense that the patterns themselves are in nonregistering relation by virtue of having different screening angles.

In addition, the transference of the ink images 65–67 to the paper creates in the following manner a fourth printed black half tone dot pattern 74. In the course of the ink transference, the magenta ink dots of ink image 66 which correspond to the B portion of image 56 (FIG. 5b) will deposit in superposed registering relation with the cyan ink dots of ink image 65 which correspond to the B portion of image 55 (FIG. 5a). Such superposed registering relation is obtained because the respective B portions of images 55 and 56 are identically positioned. For the same reason, the yellow ink dots of ink image 67 which correspond to the B portion of image 57 (FIG. 5c) will deposit in superposed registering relation with the mentioned cyan and magenta ink dots which correspond to the B portions of images 55 and 56. Thereafter, the differently coloured inks of the three superposed registering sets of ink dots will merge or amalgamate to create the colour black. The result is the black printed half tone dot pattern 74 which replicates the black half tone image 48 (FIG. 4d). As shown by FIG. 6, that black half tone dot pattern is present on the paper along with the chromatic patterns 71–73 but is differentiated from each of those chromatic patterns both by being of different colour and by having a different screening angle.

The four different colour component half tone dot patterns 71–74 form on paper 68 a composite which, in a well-known manner, appears to the eye as a colour reproduction of the original polychromatic subject 20. Thus the four patterns provide a colour print 80 (FIG. 2) of the subject. As shown by FIG. 6, the cyan, magenta, yellow and black patterns 71–74 are printed on the paper 68 in the same way and with the same colours as if such patterns had been produced by conventional four colour reproduction wherein four printing plates (cyan, magenta, yellow, black) are used. By the FIG. 1 method, however, a colour print 80 of characteristics duplicating those of the conventional four colour print is obtained by the use of only three plates instead of four.

Suitable coloured inks for providing the colour print are those of the "Cristal" series manufactured by the French firm, Ch. Lorilleux and Co. To obtain the best tonal quality for the black pattern produced by the FIG. 2 method, it is recommended that the yellow, magenta and cyan inks of such "Cristal" series as originally sold be modified as follows. In terms of percentages by volume, for the yellow plate use a mixture of 97.6% yellow ink and 2.4% magenta (i.e., "red") ink, for the magenta plate use a mixture of 83.3% magenta (i.e., "red") ink and 16.7% yellow ink, and for the cyan plate use a mixture of 87.5% cyan (i.e., "blue") ink and 12.5% magenta (i.e., "red") ink. For inks of make other than the "Cristal" series, optimum ink mixtures for the practice of the FIG. 2 method are not necessarily the same as those given above but, for any make, the optimum inks or ink mixtures may be readily determined by routine experimentation.

In the FIG. 2 method, a single black separation negative 34 is used in superposed relation with each, one at a time, of the cyan, magenta and yellow separation negatives 31, 32, 33 in order to ultimately cause production of the black half tone dot pattern 74 by the combined effects of the cyan, magenta and yellow coloured inks. Accordingly, the tonal quality of the black pattern 74 is determined by the density of the single black negative. As pointed out, however, in the mentioned application Ser. No. 431,443, it is not necessary that only a single black image carrier be used for the purpose of combining the black image with the other images. A greater degree of control over the tone of the black half tone pattern 74 can be obtained by using the technique illustrated in FIG. 7 wherein a plurality of black image carriers having images of different density are utilized to combine the black image with the chromatic images.

Figure 7:
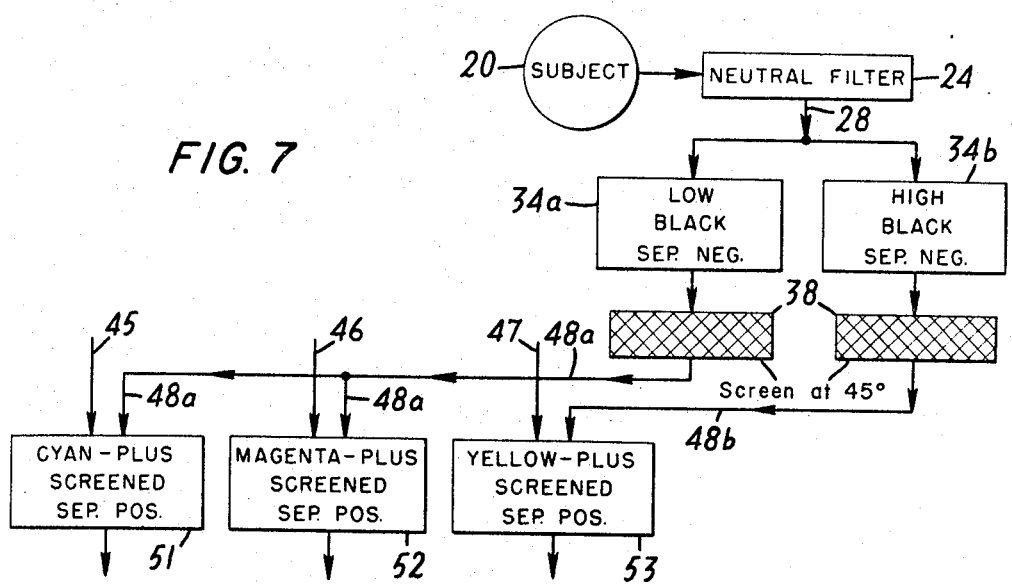
FIG. 7 is a schematic flow diagram of a modification of the FIG. 1 method.

Specifically, in the FIG. 7 modification, the neutral filter 24 is used to derive two unscreened black separation negatives 34a and 34b from the original subject 20. The black density images on the separations 34a and 34b are of relatively high and normal density, respectively, when considered in terms of their own densities, but are of relatively low density and of normal density, respectively, when those images are considered in terms of the positive images which would result therefrom. Thus, the images on negatives 34a and 34b can be properly characterized as being a low black image and a normal black image.

The black half tone light image 48a provided by negative 34a and screen 38 in combination is used, as before described, in conjunction with each of the cyan half tone light image 45 and the magenta half tone light image 46 to produce the cyan-plus and magenta-plus screened separation positives 51 and 52. The black half tone light image 48b provided by negative 34 and screen 38 in combination is used, as before described, in conjunction with the yellow half tone light image 47 to produce the yellow-plus screened separation positive 53. Thus, assuming that in colour print 80 the cyan, magenta and yellow half tone dot patterns 71–73 are uniform and of equal tone density, by the FIG. 7 modification the black tone of the black dot pattern 74 will be controlled more by the yellow ink than by the cyan ink or the magenta ink. That is, the dots representative of black of the respective "black" half tone images on the cyan and magenta plates are smaller in size than the dots representative of black of the "black" half tone image on the yellow plate.

Evidently the techniques exemplified by the FIG. 7 diagram is extendable to instances where more than two black image carrier separations are derived from one or more neutral filters or other colour component filters and/or where it is preferable to combine the half tone light image from the normal black image separation with a chromatic primary colour component light image other than yellow and/or where the separations corresponds to a colour component other than black. Accordingly, the technique permits versatile and flexible control over the tonal quality of the colour of the printed half tone dot pattern which is produced by the superposition in registration of the dots of the three subtractive colour inks. Specific ways of practice of the FIG. 7 technique are hereinafter described.

Figure 8:
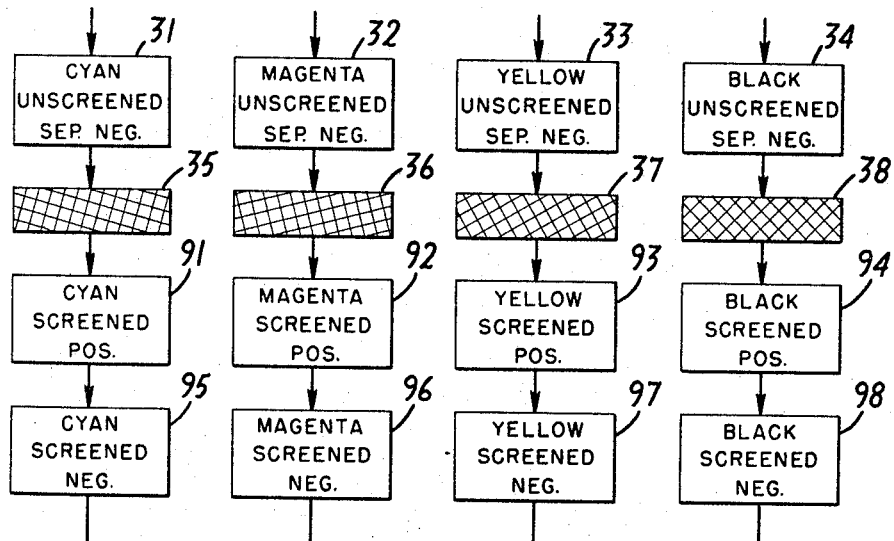
FIG. 8 is a schematic flow diagram of another modification of the FIG. 1 method.

FIG. 8 illustrates the modification of the FIG. 2 method in which the screened separation colour-plus positives 51–53 are produced in the way described in the aforementioned application Ser. No. 431,443. In the FIG. 8 modification, the four continuous tone negative separations 31–34 and the four screens 31–38 are employed to produce four corresponding screened separation positives 91–94 by conventional photographic techniques. The four positives 91–94 are in turn employed to produce four screened separation negatives 95–98, again by conventional photographic techniques. The four negatives 95–98 are then used to produce the cyan-plus, magenta-plus and yellow-plus positives 51–53 in the same way as before described (in connection with FIG. 2) excepting that, since the density images on the negatives 95–98 are already halftone images screened at the angles of screen 35–38 it is not necessary to use any screens in the course of combining the black negative 98 with each, one at a time, of the negatives 95–97 in order to produce the separations 51–53. By proceeding in the manner shown in FIG. 8, somewhat better quality images are obtained on the separations 51–53 than if those separations were to be made directly from the original negatives 31–34 as in FIG. 2.

It should be mentioned at this juncture that there are ways other than those described in connection with FIGS. 2 and 8 for obtaining and/or combining screened chromatic and black images so as to provide the three colour-plus separations 51–53, wherefore the invention is not limited to those earlier described specific ways of arriving at those colour-plus separations. For example, in connection with FIG. 2 method, it is evident that each of the colour-plus separation positives 51–53 can be produced by a double exposure technique wherein the screened light image from the corresponding one of the chromatic colour component negative 31–33 is first exposed on the photosensitive sheet from which the positive is made, and a screened black colour-component light image is then exposed on that sheet. When the double exposure technique is used, only one screen is necessary, and the desired different screening angles may be obtained by rotating the screens of the images exposed on the sheet rather than by rotating the screen. As another example, each of original negatives 31–34 may, in the first instance, be produced as a screened negative for which the screening angle is the same as associated with such negative in accordance with the description before given herein, and the screened negatives 31–34 may then be used like the negatives 95–98 in FIG. 8 to provide the colour-plus separations 51–53. The screen or screens used may be contact screens and may be provided by cross-lined patterns on transparent photographic film rather than by glass plates. The FIG. 7 multiple black image carrier technique may of course be used to advantage in conjunction with any particular mode of screening images to the end of producing separations 51–53 or ones of like character. A further description is given subsequently of improved screening techniques which are usable with and form part of the present invention.

Figure 9:
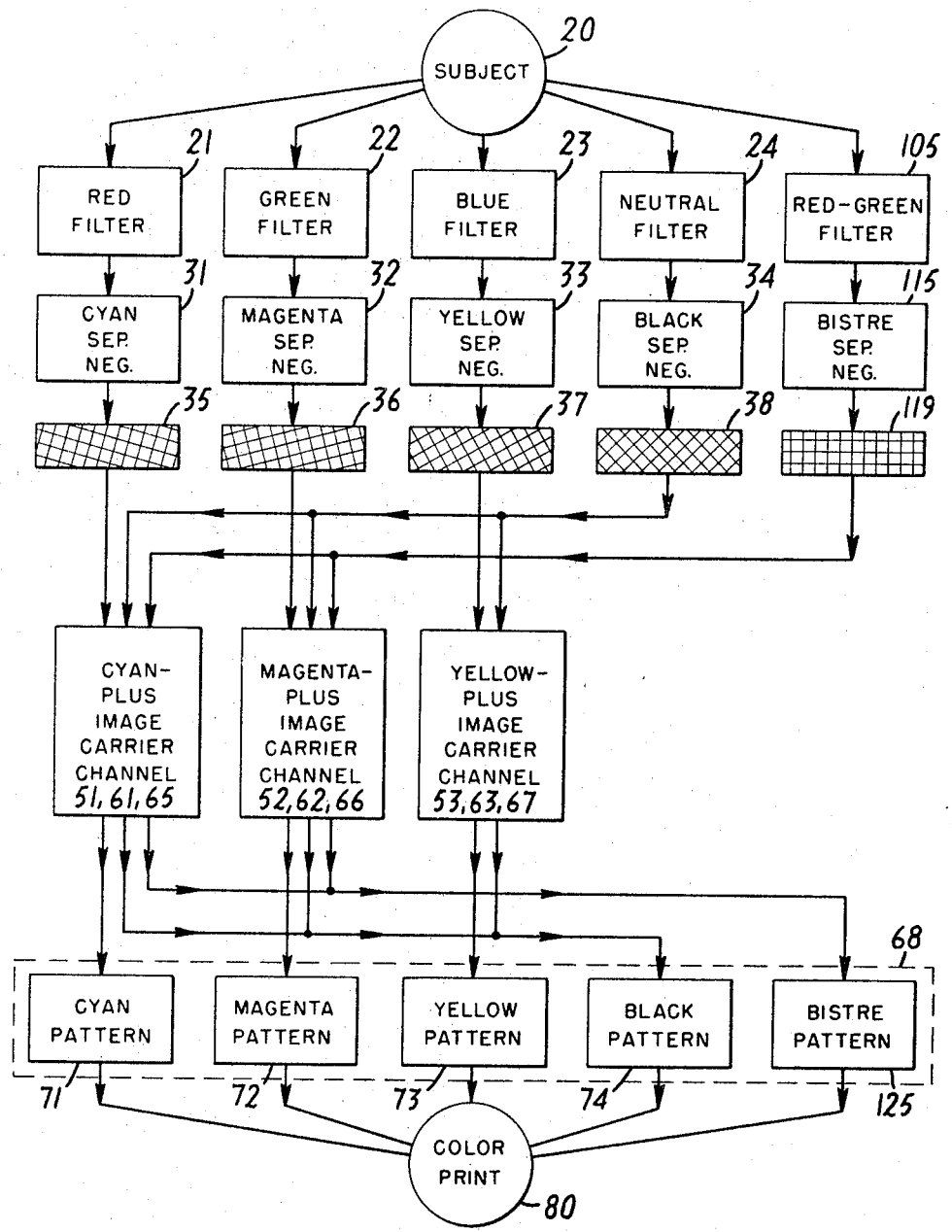
FIG. 9 is a schematic flow diagram of yet another modification of the FIG. 1 method.

FIG. 9 shows for the FIG. 2 method a modification which is described in the aforementioned application Ser. No. 431,433 and by which five geometrically distinct and differently coloured printed half tone dot patterns are obtained by the use of only three printing plates. In the FIG. 9 modification, a red-green filter 105 is used in addition to the already described filters 21–24 to derive from the subject 20 a transparent unscreened separation negative 115 which corresponds to the subtractive colour bistre (a yellowish-brown to reddish-brown colour sometimes referred to as "manganese brown"). The negative 115 and a screen 119 at a screening angle of 90° are incorporated into the superposition of elements 31, 35, 34, 38 to produce a combined cyan-black-bistre correspondent image on the separation positive 51 and into the superposition of elements 32, 36, 34, 38 to produce a combined magenta-black-bistre correspondent image on the separation positive 52. Those two images along with the combined yellow-black correspondent image on separation positive 53 are then transferred through the graphic image carrier channels 51, 65, 67 and 52, 62, 66 and 53, 63, 67 in the manner already described. Note in this connection that each of channels 51, 61, 65 and 52, 62, 66 transfers three images (ones corresponding to a chromatic primary colour component plus black plus bistre) whereas the channel 53, 63, 67 serves as before to transfer two images, namely, ones corresponding to the yellow and the black colour components of the subject. The three colour ink images transferred from the printing plates of the three channels to the ink-receiving paper 68 cause the production on that paper of a colour print 80 as a composite of the four previously described half tone dot patterns 71–74 and a fifth half tone dot pattern 125 which is bistre in colour and is geometrically distinct from the other four patterns because it is at a screening angle of 90°. As will be evident from the previous description, the bistre image is formed by the superposition in registration of those of cyan ink dots from plate 65 which correspond to the image on negative 115 and those of the magenta ink dots from plate 66 which correspond to that negative. The bistre pattern 125 serves the useful purpose in colour print 80 of enriching and giving truer colour to brown tones in that print.

Returning now to the use of different density black images described in connection with FIG. 7, it has been proposed in U.S. Patent 3,253,917 (issued May 31, 1966, to Edward D. Flynn) to form a separate black half tone pattern in a final ink print by (a) registering the same black half tone positive of an original with each, separately, of yellow, red and blue half tone positives of the original, (b) exposing the three sets of superposed images on three sheets of film to obtain combined yellow-black, red-black and blue-black half tone negatives, and (c) deriving from the last-named negatives the yellow, red and blue printing plates from which the print is made. That is, Flynn proposes that the dots forming the black half tone dot pattern in the print be formed ⅓ of yellow ink, ⅓ of red ink and ⅓ of blue ink.

When, however, the three coloured inks are combined in the proportion of ⅓ of each, the resulting black is not the true black necessary for good four colour reproduction. Instead, such black tends to be off-colour and to have a greenish (or perhaps brownish) cast. Moreover, the black which is produced fails to give as good depth and contrast in shadow and other areas of the print as will the black ink used in conventional four colour printing in the course of such printing. The prints obtainable by the mentioned proposal are, therefore, inferior in quality to the prints obtainable by conventional four colour reproduction.

I have found, however, that my presently described printing method is adapted to yield colour prints with a black content comparable to or better than that obtained by ordinary four colour reproduction if lesser contributions are made to the black half tone ink image by the cyan and magenta inks than by the yellow ink. More specifically, I have found that the percentage contributions by volume to the black ink image of the three coloured inks should (ideally) be 42% yellow ink, 30% magenta (red) ink and 28% cyan (blue) ink. In practice, the percentages necessary to yield the best black tone will vary slightly depending on the type and quality of the particular coloured inks used. In any practical instance, however, the respective percentages of the yellow, magenta and cyan inks necessary to yield the best black colour can be readily determined by routine tests.

Moreover, in all instances the optimum percentage values will not vary more than 5% (for yellow) from the specific figures which have been given. That is, to obtain the best black, the percentage contributions of the magenta and cyan inks to the black should always be less than the percentage contribution to the black of the yellow ink. Since the ideal percentages of 30% magenta ink and 28% cyan ink are so close to each other in value, the same percentage of each can be used without adversely affecting the quality of the resulting black tone.

The described differing percentage contributions of the yellow and the magenta and cyan inks to the black halftone image on the print are realized, according to the present invention, by commensurately proportioning the size of the respective half-tone dots of the respective "black" portions of the colour-plus images which are on, respectively, the yellow, magenta and cyan printing plates. That is, in each of the separate "black" half-tone images which are on the magenta plate and the cyan plate, the effective size for ink transfer purposes of the constituent half-tone dots is made smaller than the size of the dots of the "black" image on the yellow plate. Various ways of so relatively proportioning the sizes of the "black"

image dots on the three printing plates will now be described.

Referring first to FIG. 7, negative 34b provides a black image which is of normal density in the sense that it has the density of the black image appropriate in conventional four-colour printing if that form of printing were to be used. In the course, however, of exposing the image of subject 20 on the sensitized film which provides negative 34a, the image of the subject is underexposed on the film. Because of the underexposure, the areas of the latent negative image 34a which correspond to original darker tones approach normal exposure but are slightly darker (when developed) than in a normally exposed negative of the subject, where as the areas corresponding to original lighter tones are substantially darker (when developed) than they would be in a normally exposed negative of the same subject. That is, developed negative 34a as a whole will have a lower transmittance than negative 34a, and each point on negative 34b will have a greater density than the corresponding point on negative 34a.

A set of typical relations between the densities which may characterize points on negative 34b and the corresponding greater densities characterizing corresponding points on negative 34a is given by the following table.

| Density 34b | Density 34a |
| --- | --- |
| 0.90 | 1.20 |
| 1.00 | 1.40 |
| 1.10 | 1.54 |
| 1.20 | 1.68 |
| 1.30 | 1.82 |
| 1.40 | 1.96 |
| 1.50 | 2.10 |
| 1.60 | 2.24 |
| 1.70 | 2.38 |
| 1.80 | 2.52 |
| 1.90 | 2.66 |

The effect of such underexposure of negative 34a on the half tone positive 51 (or 52) formed from negative 34b is that the half tone dots in the white and intermediate gray areas of the "black image" on that positive are, respectively, reduced in size to zero and much reduced in size compared to the corresponding dots in the "black" image on half-tone positive 53 formed from negative 34a. Also, even in the dark areas of the "black" image on positive 51 (or 52), the dots are rendered somewhat smaller than the corresponding dots in the "black" image on positive 53. Further, by appropriate control of the exposure used in the course of making negative 34a, the dots of the "black" image on positive 51 (or 52) are made, on the average, about 70% of the size of the dots of the "black" image on positive 53, and such reduction in dot size of the black images paired with the cyan and magenta image relative to the dot size of the black image paired with the yellow image is a phenomenon which persists throughout the rest of the described color printing process. Hence, as desired, the respective contributions of the yellow, magenta and cyan inks to the printed black half tone image will, on the average, be about 42%, 30% and 28%, respectively. In addition, since the dots in white or intermediate gray areas of the "black" images on the magenta and cyan plates will be erased altogether or disproportionally reduced in size relative to the dots in the shadow areas of the "black" images on those plates, the black component in the final color print will be relatively attentuated in highlight areas and relatively emphasized in shadow areas so as to provide a "shadow boost" effect in the print.

In lieu of forming what is termed herein the low black image in the course of exposing a negative on film, such image may be formed in the course of exposing a positive, FIG. 10 is a flow diagram of a modification of the FIG. 8 process wherein a low black positive is so formed.

In FIG. 10, positive 94 is a normal density black positive made in a conventional manner by screening and normal exposure on a sheet of film of the image provided by unscreened black negative 34. In another process step, negative 34 is screened and the screened image thereof is exposed on an additional sheet of film providing the shown additional positive 94a. The film which is so exposed is underexposed with the follownig effects. Because of the underexposure, those areas of the latent image of the film which correspond to original lighter tones of subject 20 will, when normally developed, be of abnormally low density relative to the densities which would characterize if positive 94a had been formed by normal exposure. In other words, positive 94a is, as a whole, lighter toned than positive 94.

FIG. 15 indicates in an exemplary manner the sizes of corresponding dots which may be on, respectively, the positive 94 and the positive 94a and which represent the color component black, such dots being black dots on a white field. In FIG. 15, the scale 99 represents the maximum possible variation in dot size on element 94 as being from 0%, (the positive has no dots at all) to 100% (the dots on the positive have no interspaces therebetween). Scale 100 shows that, in practice, the dot size on positive 94 may vary from 5% to 95% in terms of scale 99. Dots on positive 94 of various specific percentage sizes (in terms of scale 99) are represented by the vertical lines 101 extending downward from scale 100.

Lower scale 99a, lower scale 100a and lower vertical lines 101a are analogous in meaning to, respectively, scale 99, scale 100, and lines 101 but differ therefrom in that the lower elements 99a, 100a and 101a apply to positive 94a. The relative lengths and locations of the upper and lower scales 99, 99a, 100, 100a and the relative locations of the upper and lower vertical lines 101, 101a are indicative of the following.

For dots on positive 94 having sizes of, say, 9%, 15% and 29%, there are no corresponding dots on positive 94a. As the size of such dots on positive 94 increases to 42%, 54%, 62%, 80% and 92%, corresponding dots appear on positive 94a and have sizes of 5%, 24%, 38%, 67% and 87%, respectively. Theoretically, a dot size of 100% (not used in practice) on positive 94 corresponds to a dot size of 100% on positive 94a.

To summarize the foregoing, for areas on positive 94 which are highlight, medium tone and shadow, the effect in corresponding areas of positive 94a on dot size is, (a) a vanishing of the dots altogether in highlight areas, (b) a substantial reduction in dot size in medium tone areas relative to the size of the corresponding dots on positive 94, (c) a small or even negligible amount of such reduction in shadow areas of the size of the dots on positive 94a relative to the size of the dots on positive 94.

As before, by proper control of the exposure used in the course of making positive 94a, the size of the dots representative of black in positive 94a are, on the average, made about 70% of the size of the dots representative of black on positive 94. Further as before, the dot size relations just described persist throughout the remainder of the color printing process. Hence, when the low density screened black image of positive 94a is combined, separately, with the screened cyan and magenta images, and, also, the normal density screened black image of positive 94 is combined with the yellow screened image, the results in the final ink color print will be the same as those previously described in connection with FIG. 7, namely, the obtaining of a true black color in the print and a "shadow boost" effect in the dark or black toned areas of the print.

While FIG. 15 has heretofore been applied specifically to the positives 94 and 94a of FIG. 10, it is to be understood that FIG. 15 is also applicable to black separation positives derived from black separation negatives such as those described in connection with FIG. 7. Moreover, FIG. 15 is directly applicable to the low black negative 34a and normal black negative 34b of FIG. 7 in that the dots in those negatives which represent black are white dots on a black field, and the dot size relations illustrated by FIG. 15 apply to corresponding white dots on the two negatives.

Returning to FIG. 10, as indicated by that figure, the normal density black screened positive 94 is utilized in conjunction with the yellow screened positive 93 to make a yellow-plus screened separation negative 137, and the low density black screened positive 94a is utilized in conjunction with each, separately, of the cyan and magenta screened positives 91 and 92 to make cyan-plus and magenta-plus screened negatives 135 and 136. In the case of relief printing, negatives 95–97 may be used directly to make the cyan, magenta and yellow printing plates 61–63 (FIG. 2). In the case of offset printing, the plates are made (as in FIG. 8) from positives derived from the negatives 135–137.

A preferred way of making the low density black image is by chemically reducing the size in a normal density image of the dots representative of black. In this connection, FIG. 11 is a schematic diagram of a dot 140 in a normal density screened black positive of the original as, for example, the positive 94 (FIG. 10). Because of the optical characteristics of the half tone screen which produced that dot, the dot 140 is not of homogenous tone density throughout its whole diameter. Instead the dot can be considered as constituted of a central core 141 of maximum tone density throughout and of a surrounding halo 142 wherein the tone density progressively decreases in the radially outward direction to finally drop down to the tone density value characterizing the white area or field adjacent the dot. In practice, the tone density decreases more or less continuously within halo 142, but, for convenience, the halo is represented in FIG. 11 as being made up of a set of concentric rings 143–146 which are each internally of the same tone density, but which decrease in density from ring to ring. That is ring 143 is of lesser density than core 141, ring 144 is of lesser density than ring 142, and so on. A dot made on a printing plate from a photographic dot of the sort shown in FIG. 11, will have a similar characteristic in that the plate dot will have a central core which prints the most ink and a surrounding halo wherein the amount of ink printed undergoes a progressive decrease in the radially outward direction.

The described tone density structure of a half tone dot is taken advantage of in the following manner to provide a low density black half tone image of the original. Referring to FIG. 10, instead of making the low density black positive 94a by underexposure as before described, that positive is orignally made by normal exposure and development so as to be the same in density as positive 94. The density of the screen dots on positive 94 is then analyzed, keeping in mind that those dots are to supply an amount of yellow ink which is 42% of the total of the ink forming the black half-tone image on the final colour print. On the basis of that analysis, the tone density image on positive 94a is treated with a conventional photographic reducing agent (i.e., an acid or other oxidizer) to reduce the size of the halos of the dots in that image to the point where the corresponding plate dots derived from such image (i.e., the corresponding dots on the cyan and magenta plates) will each contribute 29% of the total ink which forms the ink printed black half-tone images. Subsequent to that reducing treatment, the low density black screened black positive 94a, is used (as described in connection with FIG. 10) in conjunction with positives 91–93 to provide the colour-plus separations 135–137.

As described above, the same low-density black separation is used with each of the magenta and cyan separations to ultimately provide magenta and cyan plates which each contributes 29% of the total ink forming the black half-tone printed inked image. Alternatively, however, separate low density black separations can be derived and used as intermediate agencies in the making of, respectively, the magenta plate and the cyan plate such that, in full accordance with theory, the magenta and cyan plates contribute 30% and 28%, respectively, of the coloured inks forming the "black," the remaining 42% being, of course, contributed by the ink from the yellow plate.

Moreover, in colour printing methods according to the invention wherein normal density and low density black screened negatives are used, such negatives can be provided by making contact prints of positive 94 and of positive 94a after the effective size of the dots in the latter positive have been reduced, as described, by a photographic reducing agent.

Turning now to another subject, it is further proposed by Flynn in his patent to form his combined half-tone negatives by merely placing the same screened half-tone positive in direct contact with, one at a time, his yellow, red and blue half screened tone positives, and by then exposing sheets of film by passing light through the black and the colored positive which are superposed in each instance. That proposal is depicted in FIG. 12 wherein the numbers 150, 151 and 152 designate, respectively, the black screened positive, a colored screened positive (e.g., the yellow screened positive) and the sensitized film on which the exposure is to be made. As shown, each of the three superposed sheets of FIG. 12 is comprised of a transparent relatively thick base. The bases 145 and 155 of positives 151 and 152 carry on one side thereof relatively thin layers 156 and 157 of material which form the half-tone images on those positives. The base 158 of film 153 carries on one side thereof a relatively thin emulsion coating 159 which is sensitized to provide the combined latent image upon exposure of the coating by light passing from light source 160 through positives 151 and 152.

In the FIG. 12 arrangement, positive 152 is placed on film 153 so that the image layer 157 of the positive is in direct contact with the emulsion coating 159 of the film. Then, however, in order for the image on positive 151 to be right way round in relation to the image on positive 151, the positive 151 must be placed face down on positive 152 so that image layer 156 of positive 151 is separated by the thickness of base 155 from the image layer 157 of positive 152.

Now consider the effect of the described stacking of positives 151 and 152 on the half-tone dots formed by exposure on the emulsion coating 159 of film 153. Because the image layer 157 of the yellow screened positive is in direct contact with the coating 159, the passage of light through the positives will cause a half tone dot 167 in the yellow image to be reproduced in the emulsion 159 as a dot 168 of almost exactly the same size. In the case, however, of a dot 164 in the black image, the light from source 159 which reproduces such dot must pass through base 155 before it reaches coating 158 and, within base 155, the light is diffracted so that the reproduction 168 in coating 158 of dot 164 is smaller in size than dot 164 itself. While such shrinkage in size of the reproduction 168 of dot 164 might seem minor on first thought, it must be remembered that the half tone dots of an image are very small (i.e., of a diameter of 0.0078 mm. on the average) so as to be of the same order as the thickness of base 155, wherefore the difference in size between reproduced dot 169 and original dot 164 is an appreciable percentage of the size of the original dot.

Accordingly, in the arrangement of FIG. 12, the value of the ratio of the size of the "black" dots 169 to the "yellow" dots 168 in the combined image formed on film 153 will depart (as a function of the thickness of base 155) from (a) the value of the ratio of the size of the dots in black image 156 to the size of the dots in yellow image 157 or (b) more generally, from the value of the ratio of the tone density values of the black image 156 to the tone density values of the yellow image 157. That departure is disadvantageous because it disturbs the balance between black and colour in the final ink print.

The mentioned disadvantage of the prior art practice is overcome in accordance with the present invention by the use of the previously described double exposure technique for making the color-plus separations. In that technique, a black image separation of the original is first placed in contact with a sheet of sensitized film and the black image exposed on the film. Subsequently, a color separation of the film (e.g. the yellow separation) is placed in contact with the film so that the image on the color separation is in right way round relation with the exposed black image and is in the same position relative to the film as was the black image on the black separation. The color image is then exposed on the film. In this way, the "black" and "colour" dots in the colour-plus image on the film will have the same size relation to each other as do the "black" and "colour" dots in the black and colour separations. Of course, the color image may be exposed on the film before the black image. Also, while the images on the black and colour separations will be ordinarily screened images, this is not a necessary condition. Alternatively, screening and double exposure can be carried out at the same time by (a) using continuous tone black and color separations (b) superposing a screen on each of the two separations when the image of that separation is being exposed on the film (c) varying the screening angle, as described, as a function of which one of the black and colour separations is then being used to expose an image on the film.

Finally, while when using the double exposure technique, it is preferable to place each of the separations with its image side against the sensitized film, the same technique can be used in the instance where the separations are placed (sequentially) in contact with the film so that the image sides of both separations are away from the film. With that latter practice, the light from source 160 must pass through the base of each separation in order to reach the film but the light will be equally diffracted by each such base so as to preserve in the colour-plus image on the film, the ratio obtaining between the size of the dots in the black separation and the size of the dots in the color separation.

Another exemplary way of substantially preserving that ratio is shown in FIG. 13 wherein reference numerals 171, 93 and 137 designate, respectively, a black screened positive separation of the original, the yellow screened positive separation of FIG. 9, and a sheet of sensitized film providing the yellow-plus screen separation negative (FIG. 9). As in FIG. 12, black separation 171 is comprised of a transparent base 174 and an image layer 175, yellow separation 93 is comprised of a transparent base 176 and image layer 177 and film 137 is comprised of a base 178 and emulsion coating 179 to receive the image formed by passage of light from source 180 through separations 171 and 93. The arrangement of FIG. 13 differs, however, from that of FIG. 12 in the following respects.

First, the image layers 175 and 177 of the two separations are placed in contact with each other rather than being separated by the thickness of the base of one of the separations as in FIG. 12. At the same time the respective images provided by layers 175 and 177 are right way round in relation to each other.

Second, the underlying separation 93 is placed with its base 176 in direct contact with the emulsion coating 179 of film 137. To so place separation 93 is necessary in order for the image layers of the two separations to be in contact with each other. It follows that image layer 177 is spaced from coating 179 by the thickness of base 176. Similarly, image layer 175 is spaced from the coating 179 by the thickness of base 175 plus the very small thickness of image layer 177. That is, the positions of layers 175 and 177 relative to film 137 differ from each other by only the thickness of layer 177; i.e., by less than the thickness of the base of either one of the separations 171 and 93.

Assume now that light source 180 is activated to pass light through separations 171 and 93 so as to form in coating 179 both a latent image 182 and a latent image 183 of, respectively, an exemplary half-tone dot 185 in the black screened image provided by layer 175 and an exemplary half-tone dot 187 in the yellow screened image provided by layer 177. In order to reproduce yellow dot 187 as dot 183, the light must pass through base 176 and, within that base, is diffracted so that dot 183 is smaller than original base. Similarly, in order to reproduce dot 185 as dot 182, light must pass through image layer 177 and base 176 and, within that base, is diffracted to render dot 182 smaller than dot 185. Since, however, the thickness and the diffraction power of layer 177 are both negligible and since, also, the light is equally diffracted in base 176 in the course of reproducing dots 185 and 187 the dots 182 and 183 are proportionately reduced in size relative to their source dots 185 and 187. Therefore, in the colour-plus image formed on film 137, the ratio in size of the "black" dots to the "yellow" dots remains substantially the size as the ratio in size of the dots of black separation 191 to the dots of yellow separation 93.

There remains for consideration how the black and colour separations of FIG. 13 may be formed so that (1) the respective images thereon will be right way round when, as shown, the image layers of the two separations are placed in direct contact with each other, and (2) will maintain the proper size relation between the respective dots on the two separations. On first impression, it might be thought that such could be done in the course of forming the separations by exposing the images which appear thereon with light which, for the one separation, originates from the base side thereof and, for the other separation, originates from the emulsion side thereof. Because, however, the exposing light for the two separations would be diffracted by passage through the base of the one separation but would not be diffracted by passage through the base of the other separation, to do so would be to merely introduce at an earlier stage the problem of distortion of the proper size relation between the black dots and color dots.

The problem just mentioned may be avoided according to the invention in a manner as follows. Referring to FIG. 14, the yellow screened separation positive 93 and the normal density black screened separation positive 94 are made as before described in connection with FIGS. 8 and 10. That is, yellow positive 93 is made by contact printing from negative 33 and screen 37. Similarly, black positive 94 is made by contact printing from negative 34 and screen 38. In those contact printings the image layers 190 and 192 of, respectively, negatives 37 and 34 are placed in direct contact with the emulsion coatings 191 and 193 of, respectively, the sensitized film providing positive 93 and the sensitized film providing positive 94. Thus, the images 194 and 195 on negatives 33 and 34 will appear on positives 93 and 94 as images 196 and 197 which are in right way relation to each other when viewed from the direction indicated by arrows 198.

So far, the method steps shown in FIG. 14 are the same as those used in conjunction with the FIG. 10 method. The FIG. 14 method now, however, departs from that of FIG. 10 in that the following additional step is introducted. Positive 94 is rotated through 180° so that its image side is downward (in FIG. 14) and is then placed in contact with the upward facing emulsion coating 200 of a sensitized sheet of direct positive film 201. When positive 94 is so placed, the image 197 thereon is in mirror relation with the image 196 on positive 93. By contact printing, the mirror image 197 is transferred to direct positive film 201 to form thereon a positive image 202 which is also in mirror relation to the reference image 196 when both images are viewed in the direction indicated by arrows 198. After image 202 has so been exposed, film 201 is developed and otherwise processed to provide the black separation positive 171 of FIG. 13.

The yellow screened positive 93 is then laid (FIG. 14) with its image side up on the emulsion coating 179 of sensitized film 137. Next, positive 171 is rotated through 180° to position its image side 175 downward (in FIG. 14) and is then placed on top of positive 93. When so placed, the image layer 175 of black screened positive 171 is in contact with the image layer 177 of yellow screened positive 93 to provide the beneficial results described in connection with FIG. 13. At the same time, because the black image has been twice rotated through 180° (once in exposing film 201 and once in superposing the resulting positive 171 with positive 93), the "black" image 202 of positive 171 is in right way round relation with the "yellow" image 194 of positive 93. Accordingly, the two images 194 and 202 are in proper relation to permit exposure on film 137 of the yellow-black image described in connection with FIG. 13. From the foregoing description, it will be evident that the satisfying of the two conditions of FIG. 13 that (a) the images of the black and color separations be in contact with each other, and (b) that those images simultaneously be in right way relation with each other is an achievement made possible by the use of contact printing on a direct positive film as a step precedent to forming the color-plus separation in question.

While FIG. 14 depicts specifically the use of a direct positive film only in the course of making the yellow-plus screened separation from the yellow and normal density black separations, it is evident and preferred to likewise use a direct positive film in the course of making the cyan and magenta screened color-plus separations 135 and 136 (FIG. 10) from the color separations 91, 92 and the low density black separation 94a. Further, it is evident that the step of contact printing on direct positive film may be used to print positives of the color separations 91–93 on such film rather than to print positives of the black separations 94 and 94a on such film. Still further, in instances where it is desired to print color-plus separation positives from color and black separation negatives (as in FIG. 8), the step of printing on direct positive film may be used to provide intermediate negatives.

The above-described embodiments being exemplary only, it is to be understood that additions thereto, modifications thereof and omissions therefrom can be obtained without departing from the spirit of the invention, and that the invention comprehends embodiments differing in form and/or detail from those specifically described. For example, it will be evident that either one or both of the techniques illustrated by FIGS. 7 and 8 are compatible with the FIG. 9 technique and may to advantage be practiced in conjunction with the latter technique. Further, as pointed out in the aforementioned application Ser. No. 431,443, it is not always necessary in four colour printing to reproduce the achromatic colour component of the print by using all three of the subtractive colour printing plates. In some instances, as when brown is desired as the achromatic colour component, a printed half tone pattern of the desired achromatic tone can be obtained by the use of only two plates. Moreover (and as further pointed out in application Ser. No. 431,443), the invention is not limited to printing by three subtractive colour plates but is of application when more than three plates are used to provide the advantages of a saving of one or more plates (from the number which, conventionally, would otherwise be used) and/or of an improvement in the tonal quality of the colour print (by virtue of that print being a composite of a greater number of distinct differently colored half tone patterns than would be present by conventional practice). While the use of a neutral filter has been described to obtain an achromatic colour component separation, in some instances such separation may be obtained without any filter by exposing the unfiltered light image from the subject on panchromatic film. Also, in connection with the use herein of the term "inks," such inks may be any material in a liquid, dry or other state which is capable of producing a printed half tone dot pattern of different colour than the background on which such pattern is printed.

When the images derived from the polychromatic original subject are electric signal images during one or some of the initial stages of the colour reproducing method, the screening of those images may, of course, be done electronically rather than optically.

Accordingly, the invention is not to be considered as limited save as is consonant with the recitals of the following claims.

I claim:

1. In a method for reproducing colour by half tone in which at least three different chromatic primary colour component first images and a black colour component second image of an original are converted into corresponding first and second half tone images, comprised of different positional distributions of half tone dots, and the second half tone image is multiplexed on separate ones of a plurality of utilized graphic image carriers with said three first half tone images such that three of said carriers each has thereon both said second image and a first image respective thereto, the improvement comprising, deriving from said original at least a third half tone image differing both in represented colour component and in the positional distribution of its half tone dots from said first and second half tone images, and transferring said half tone image to at least two of said carriers to be shared among and identically positioned on such carriers and to be multiplexed on such carriers with other of said half tone images, said two last-named carriers being each selected according to the colour corresponding thereto to permit reconstitution of said third image as a separate image in its own colour component by registering ink half tone images derived from said shared images, and to render the number of said utilized carriers leser by at least two than the number of utilized different colour component images.

2. In colour printing means comprised of a plurality of utilized colour printing plates of which each of at least three of such plates has thereon both a first half tone image respective to that plate and derived from the same polychromatic original and a second half tone image derived from said original and identically positioned on each of such three plates, the first image on said three plates each corresponding to a respective one of three different chromatic primary colour components of said original, and said second image corresponding to the black colour component of said original, and said three first images and said second image each having a different positional distribution on said three plates of the constituent half tone dots of the image, the improvement in which each of ones of said plurality of plates has thereon at least a third half tone image derived from said original and corresponding to a colour component of said original different from the colour components corresponding to said first and second images, said third image being common to and identically positioned on said ones of said plates and having a positional distribution of its constituent half tone dots different from the positional distributions of half tone dots characterizing said first and second images, said third image being multiplexed on said ones of said plates with other of said half tone images, and said plurality of utilized plates consisting of at least two less plates than the total number of different utilized colour component images.

3. In a half-tone method for reproducing a coloured original by at least three graphic image carriers of which each of said three carriers has thereon a respective one of three different chromatic primary colour component half-tone images of said original including a yellow half-tone image thereof, and in which said chromatic half-tone images have different positional distributions of the constitutent dots thereof and there is derived from said original a first black colour component half-tone image having a positional distribution of its constituent half-tone dots differing from the positional distributions of dots characterizing said chromatic images, the improvement comprising, multiplexing said first black half-tone image only with said yellow half-tone image on a first graphic image carrier, deriving a second black colour component half-tone image of said original, said second image having the same positional distribution of dots as said first image but having dots representative of black which are smaller in size than the corresponding dots of said first image, multiplexing said second black half-tone image on a second graphic image carrier with one of said non-yellow chromatic half-tone images, and multiplexing on a third graphic image carrier with the other said non-yellow chromatic half-tone image a black colour component half-tone image of said original having the same positional distribution of dots as said first image but having dots representative of black of smaller size than the corresponding dots of said first image, said black half-tone images on the last-named three carriers being identically positioned thereon.

4. The improvement as in claim 3 in which each of the black half-tone images on said second and third carriers is characterized in highlight areas by the absence of dots representative of black and in medium tone and shadow areas by dots representative of black which are reduced in size to a greater and lesser extent, respectively, relative to the corresponding dots of said first black half-tone image on said first carrier.

5. The improvement as in claim 3 in which said second black half-tone image is obtained by forming on photographic film a copy of said first black half-tone image and reducing by a photographic reducing agent the effective size for ink transfer purposes of half-tone dots of said copy which are representative of black.

6. In colour printing means comprised of at least three colour printing plates of which each of said three plates has thereon both a first half-tone image of an original which is respective to that plate and a second half-tone image derived from said original and identically positioned on each of said plates, the first images on said three plates each corresponding to a respective one of three different chromatic colour components of said original including a yellow component, and the second images on said three plates each corresponding to the black colour component of said original, and in which said three first half-tone images have different positional distributions of the constituent dots thereof and the second half-tone images on said three plates have positional distributions of the dots thereof which are the same for all said second images but different from the positional distributions of dots characterizing said chromatic half-tone images, the improvement in which the black half-tone images on the two of said three plates bearing the non-yellow chromatic half-tone images are comprised of dots representative of black which are reduced in size relative to the size of the corresponding dots of the black half-tone image on the plate bearing the yellow half-tone image.

7. The improvement as in claim 6 in which the dots respresentative of black of the black half-tone images on the plates bearing the non-yellow chromatic half-tone images are absent from highlight areas and in medium tone and shadow areas are reduced in size to a greater and lesser extent, respectively, relative to the corresponding dots representative of black of the black half-tone image on the plate bearing the yellow half-tone image.

8. In a method for reproducing a polychromatic original by at least three different chromatic primary colour component images of said original and a black colour component image thereof, the improvement comprising, supplying two separation transparencies each comprised of a base bearing an image which for one and the other of said transparencies is, respectively, a first of said chromatic images and said black image, registering said two transparencies with a first sheet of photographic film by placing those transparencies such that the images thereon are relatively right way round and are respectively positioned to differ in position relative to said sheet by less than the base thickness of either of said transparencies, exposing the images on said two transparencies on said film to provide thereon a black half-tone image and a first chromatic half-tone image each comprised of half-tone dots of which the ratio of the siz of the dots of the black image to those of the chromatic image is independent of the base thickness of either of said transparencies, and repeating said placing and exposing steps so as to transfer the second and third of said chromatic images with accompanying black images of said original to, respectively, a second and a third sheet of sensitized photographic film to form on each of said last named sheets a combined half-tone image wherein the ratio of the size of the black dots in such image to the size of the colour dots therein is independent of the thickness of the base of either of the transparencies used to make that combined image, the black half-tone images on said three sheets of film being identically positioned thereon and having the same positional distribution of constituent half-tone dots, and the three chromatic half-tone images on said three films having respective positional distributions of constituent dots which differ from each other and from that of said black half-tone images.

9. The improvement as in claim 8 in which said two separation transparencies are registered in sequence with said first sheet of film, and the images on said two separation transparencies are exposed on said sheet of film by double exposure thereof.

10. The improvement as in claim 8 in which one of said two separation transparencies is formed from direct positive film to have the image thereon right way round in relation to the image on the other transparency when said two transparencies are superposed in contact with each other to have the image sides thereof towards each other, and in which said images on said two transparencies are half-tone images, and said exposing of said first sheet of film is carried out by superposing said two transparencies with the image sides thereof being in contact with each other and with said transparencies being in registering relation with said sheet of film, and by then passing light simultaneously through both transparencies to expose on said sheet the respective half-tone images on said two transparencies.

References Cited

UNITED STATES PATENTS 2,112,416 3/1938 Dewberry.
2,331,772 10/1943 Gibson.
3,253,917 5/1966 Flynn _____ 101—211 X

OTHER REFERENCES

Flader et al. Modern Photoengraving, 1948, Modern Photoengraving Publishing, Chicago. TR 970. F6, pp. 122 to 126.

DAVID KLEIN, *Primary Examiner.*

UNITED STATES PATENT OFFICE
CERTIFICATE OF CORRECTION

Patent No. 3,381,612                                              May 7, 1968

Manuel J. Lecha

It is hereby certified that error appears in the above numbered patent requiring correction and that the said Letters Patent should read as corrected below.

Column 2, line 17, "process printing" should read -- process for colour printing --. Column 4, line 39, "will be" should read -- will now be --. Column 10, line 63, "or" should read -- of --. Column 12, line 29, "block" should read -- black --. Column 15, line 66, "attentuated" should read -- attenuated --; line 71, "positive," should read -- positive. --. Column 20, line 34, "to do so" should read -- to so do --. Column 22, line 35, "leser" should read -- lesser --; line 50, "the", first occurrence, should read -- that --. Column 24, line 16, "siz" should read -- size --.

Signed and sealed this 19th day of August 1969.

(SEAL)
Attest:

EDWARD M. FLETCHER, JR.                                  WILLIAM E. SCHUYLER, JR
Attesting Officer                                              Commissioner of Patents